United States Patent Office 2,889,959
Patented June 9, 1959

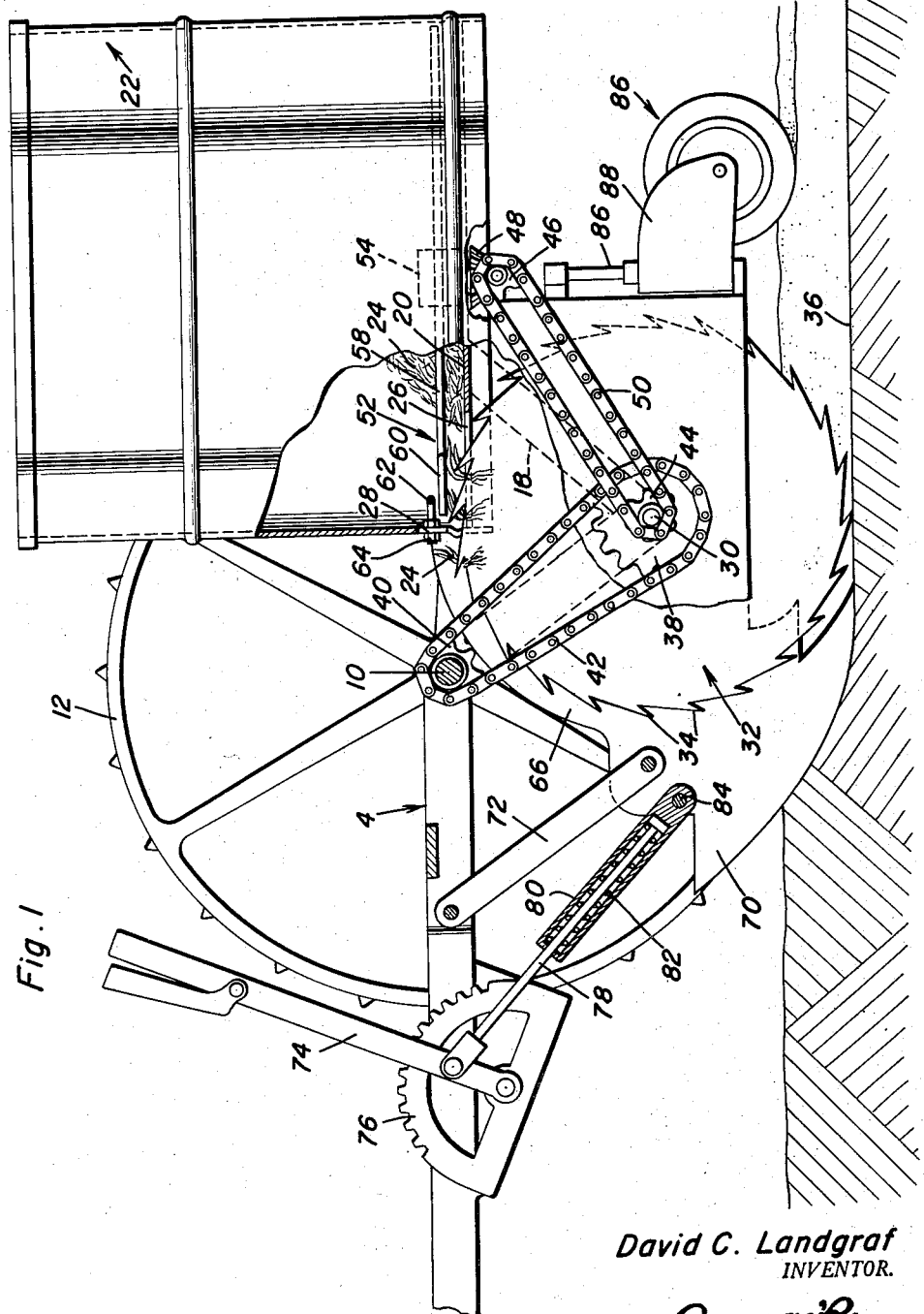

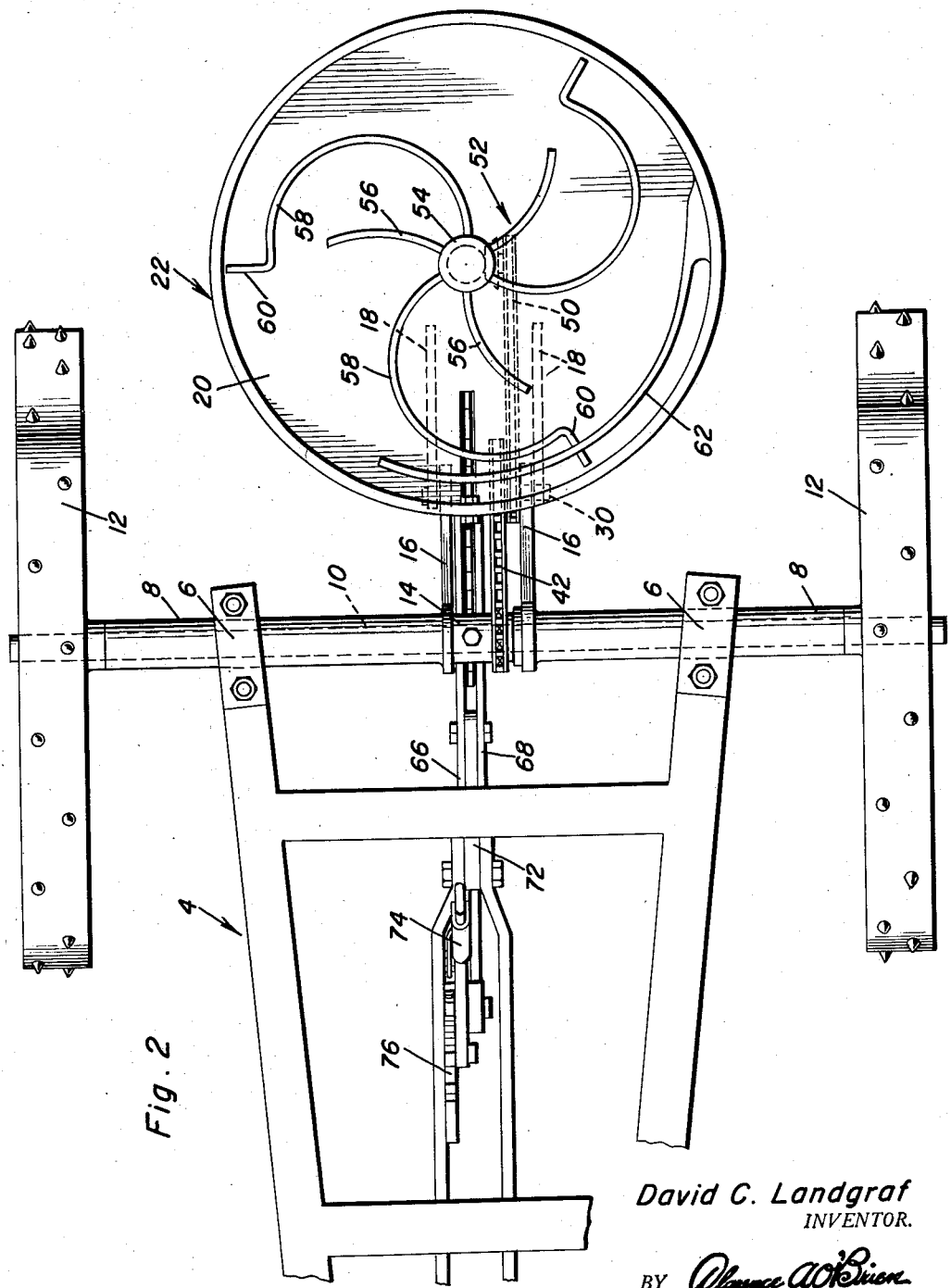

2,889,959
GRASS ROOT PLANTER
David C. Landgraf, Simpson, Okla.
Application June 28, 1956, Serial No. 594,524
3 Claims. (Cl. 221—42)

The present invention relates to a simple machine characterized by a wheel supported frame and hopper and having properly cooperating facilities for conveying and planting Bermuda grass and the like.

More particularly, the invention has to do with a wheeled frame supporting the aforementioned hopper and which is characterized, in addition, by at least one plow or equivalent furrow-opener whereby to prepare the furrow and to deliver the grass sprigs into the stated furrow.

An object of the invention is to structurally, functionally and otherwise improve upon similarly constructed and performing seed and equivalent depositing type planters and machines by providing a special adaptation in which manufacturers will find their manufacturing requirements and economizing practices taken into account and satisfactorily served, and farmers, landowners and others will find their grass and equivalent planting needs satisfactorily met.

Novelty is predicated on the aforementioned structural improvements and adaptations and wherein the hopper has a slotted bottom through which teeth on a rotating saw operate in a manner to permit the grass roots to be caught hold of and delivered into the aforementioned prepared furrow.

Additional novelty has to do with the structure stated and the spider-like rotor which is mounted within the hopper at the bottom thereof and which serves not only as an agitator but also as a rotatable sweeping rake as well as a distributor and therefore functions to assist in keeping the discharge slot from clogging and also which assist in feeding the roots so that they may be readied for progressive "clawing" and removal for planting purposes.

Other objects, features and advantage will become more readily apparent from the following description and the accompanying sheets of official drawings.

In the drawings, wherein like numerals are employed to designate like parts throughout the views:

Fig. 1 is a view in section and elevation of a grass roots planter constructed in accordance with the principles of the invention and showing how it is constructed and used; and Fig. 2 is a top plan view of the same.

Referring now to the drawings, the portable or mobile frame, of suitable construction, is denoted by the numeral 4. Secured by brackets or the like 6 are axially aligned tubular members 8 providing bearings for the axle 10 to the outer ends of which the ground engaging wheels 12 are fixed for rotation. The numeral 14 designates a spacing collar between the inner ends of said bearings and at which point the bearings are provided with downwardly and rearwardly inclined spaced frame members 16 cooperating with similar upwardly and rearwardly inclined members 18 connected with the bottom 20 of a hopper 22. The aforementioned grass roots or sprigs 24 are loaded into the receptacle-type hopper and are discharged progressively approximately one-by-one by way of the radial discharge slot 26 in the bottom. This is eccentrically arranged and opens through the marginal edge and registers with a similar discharge slot 28 in the lower skirt portion of the hopper. Where the frame members 16 and 18 converge there is a suitable shaft 30 on which a rotary or disk saw 32 is mounted for rotation. The V-shaped teeth on the saw are circumferentially spaced and are denoted by the numeral 34. The diameter and positioning of the saw is such that the teeth sweep through the slots 26 and 28 and pick up the sprigs or roots one at a time and carry them from right to left in Fig. 1 and deposit the same for planting in the furrow 36. The shaft 30 is provided with a sprocket 38 cooperating with a sprocket 40 on the aforementioned shaft 10 which sprockets are provided with a sprocket chain 42. There are additional sprockets provided and the sprocket 44 is on the shaft 30 and the sprocket 46 is suitably mounted and arranged to drive a beveled gear 48 the two sprockets having an endless sprocket chain 50 trained thereover. The beveled gear 48 drives the rotatable spider-like grass roots distributor and rake which is generally denoted by the numeral 52. This rake has a suitably driven hub 54 and horizontal wire tines or fingers. There are alternate short curved resilient fingers 56 and longer arcuate and rapier-like fingers 58 which are circumferentially spaced and have straight terminal or outer ends 60 sweeping around the marginal portion of the floor or bottom of the hopper. In fact, these terminals 60 sweep and rake between the fixed arcuate and elevated rail-like member 62 and underlying floor. The member 62 provides a finger hold-down guide and conforms in curvature to and is fastened interiorly to one side wall of the hopper as at 64. It is in close proximity to the floor and has an end portion bridging the aforementioned discharge slot at the necessary height. This is to assist in the raking and distributing function of the hopper and it assists in preventing clogging and assists in reasonably continuous operation of the hopper even when it is fully loaded or when the load gets down to its "low level" range.

A pair of spaced plates 66 and 68 are suitably mounted and are in close parallelism and form a sheath and guard for the saw. The forward end of at least one sheath plate is fashioned as at 70 to form a furrow opening shoe or plow. The numeral 72 designates a brace, 74 a lever, 76 a rack and these are arranged as seen in Fig. 1 and cooperate with the frame 4. The lever 74 is provided with a link 78 operating in a cylinder 80 having a cushioning spring 82 therein and with a cylinder pivoted at 84 on the plow.

There is a suitable bracket 86 on the rear end of the sheath having a suitable mount 88 for a rubber tired guide roller 86. This traverses in the trench or furrow and assists in guiding and enabling the user to control the machine.

The construction shown is such as to insure a proper flow of grass roots from the hopper by way of the slot means and saw into the furrow. As the saw advances through the roots they are firmly gripped and caught in the saw teeth, withdrawn from the slot means and are placed gently but firmly in the soil.

The spider-like rotor on the interior of the hopper not only provides for desired agitation and loosening of the grass roots as they descend for discharge, but also assists in equalizing, distributing and raking, and thus spreads the grass roots over the bottom for easier pick-up and delivery purposes.

It is to be explained that the saw is designed with alternate teeth that are set much like those of a ripsaw with one or more teeth constructed to clear out the slot means and to minimize clogging. The machine in an over-all sense is simple in form with a minimum of material in construction. Nevertheless, it is highly maneuverable. This is especially so in making short turns. There is little side draft. The construction is such that the machine operates on very rough ground with little or no seed bed preparation. The machine is so designed as to minimize exposure from the sun and wind and from root drying while planting.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A carrier and planter for Bermuda grass roots and the like comprising, in combination, a mobile wheel supported frame, a grass roots containing and supply hopper fixedly mounted in an elevated position on said frame, said hopper having a substantially flat bottom which is circular in plan, said bottom being provided with a single radial slot opening at its outer end through the outer marginal edge of said bottom, the lower portion of the wall of said hopper adjacent to the slot in said bottom being, in turn, provided with a vertical slot registering with said radial slot, said slots being restricted in width and being adapted to permit movement therethrough of a saw, a circular saw mounted for rotation on said frame and disposed in a vertical plane, operating means operatively connected with said saw, a limited segmental portion of the toothed edge of said saw being moved by the operating means through said slots in such a manner that grass roots contained in the hopper and bridging the radial slot are accordingly caught hold of by the saw teeth and are progressively withdrawn by way of the slots and teeth for planting in a furrow, a horizontally disposed rotor mounted for rotation in spaced parallelism above the interior of the bottom of the hopper, said rotor having alternating short curved fingers and longer arcuate fingers, the outer terminals ends of said longer fingers being straight and moving close to the interior surface of the vertical wall of the hopper, and an arcuate guide member mounted on the interior of the slotted wall of the hopper and conforming in curvature to the curvature of the wall of the hopper and being in spaced parallelism above the bottom of the hopper and having an end portion bridging the radial slot and being spaced therefrom, a prerequisite vertical distance, the terminal ends of said longer arcuate fingers being confined for operation in the space between the guide member and bottom of the hopper, and an operating connection between the rotor and saw which serves to rotate the saw and rotor simultaneously but at prerequisite relative speeds of rotation.

2. A carrier and planter for Bermuda grass roots and the like comprising, in combination, a mobile wheel supported frame, a grass roots containing and supply hopper fixedly mounted in an elevated position on said frame, said hopper having a substantially flat bottom which is circular in plan, said bottom being provided with a single radial slot opening at its outer end through the outer marginal edge of said bottom, the lower portion of the wall of said hopper adjacent to the slot in said bottom being, in turn, provided with a vertical slot registering with said radial slot, said slots being restricted in width and being adapted to permit movement therethrough of a saw, a circular saw mounted for rotation on said frame and disposed in a vertical plane, operating means operatively connected with said saw, a limited segmental portion of the toothed edge of said saw being moved by the operating means through said slots in such a manner that grass roots contained in the hopper and bridging the radial slot are accordingly caught hold of by the saw teeth and are progressively withdrawn by way of the slots and teeth for planting in a furrow, a horizontally disposed rotor mounted for rotation in spaced parallelism above the interior of the bottom of the hopper, and an operating connection between the rotor and saw which serves to rotate the saw and rotor simultaneously but at prerequisite relative speeds of rotation, said rotor having alternating short curved fingers and cooperating coplanar longer fingers, said longer fingers being arcuate and rapier-like and of a length that their outer ends rotate in a path of movement in close proximity to the interior surface of said hopper.

3. A carrier and planter for Bermuda grass roots and the like comprising, in combination, a mobile wheel supported frame, a grass roots containing and supply hopper fixedly mounted in an elevated position on said frame, said hopper having a substantially flat bottom which is circular in plan, said bottom being provided with a single radial slot opening at its outer end through the outer marginal edge of said bottom, the lower portion of the wall of said hopper adjacent to the slot in said bottom being, in turn, provided with a vertical slot registering with said radial slot, said slots being restricted in width and being adapted to permit movement therethrough of a saw, a circular saw mounted for rotation on said frame and disposed in a vertical plane, operating means operatively connected with said saw, a limited segmental portion of the toothed edge of said saw being moved by the operating means through said slots in such a manner that grass roots contained in the hopper and bridging the radial slot are accordingly caught hold of by the saw teeth and are progressively withdrawn by way of the slots and teeth for planting in a furrow, a horizontally disposed rotor mounted for rotation in spaced parallelism above the interior of the bottom of the hopper, an operating connection between the rotor and saw serving to rotate the saw and rotor simultaneously but at a prerequisite speed of rotation, an arcuate guide member mounted on the interior of the slotted wall of the hopper and conforming in curvature to the curvature of the wall of the hopper and disposed in close spaced parallelism above the bottom of the hopper and having an end portion bridging the radial slot and spaced therefrom a prerequisite distance, said rotor embodying a centrally disposed hub provided with a plurality of circumferentially spaced equidistant radially extending fingers, certain of said fingers being resilient and having outer end portions operating in the restricted space adjacent to the slots, and an arcuate guide and guard member fixedly mounted on the interior of the slotted wall of the hopper and conforming in curvature to the curvature of the wall of the hopper and being disposed in close spaced parallelism relative to the bottom of the hopper and having an end portion bridging the radial slot and spaced therefrom, the outer ends of the aforementioned fingers being confined and operating in the space between the guide member and bottom of the hopper.

References Cited in the file of this patent

UNITED STATES PATENTS

| | | |
|---|---|---|
| 85,195 | Young | Dec. 22, 1868 |
| 1,512,256 | White | Oct. 21, 1924 |
| 2,715,882 | Overstreet | Aug. 23, 1955 |